United States Patent

[11] 3,614,574

| [72] | Inventors | Hato R. Hodges<br>169 Horizon Lane, Rancho Calevero Mobile Park;<br>Fred J. Schnell, 97 Blue Sky Lane, Rancho Calevero Mobile Park, both of Oceanside, Calif. 92054 |
|---|---|---|
| [21] | Appl. No. | 11,368 |
| [22] | Filed | Feb. 16, 1970 |
| [45] | Patented | Oct. 19, 1971 |

[54] REVERSIBLE FOLLOW UP POSITIONING DEVICE FOR MOBILE ANTENNA STRUCTURES OR THE LIKE
8 Claims, 9 Drawing Figs.

[52] U.S. Cl........................................ 318/467,
318/673
[51] Int. Cl..................................... G05b 11/14
[50] Field of Search........................... 318/672,
673, 293, 31, 467; 343/714

[56] References Cited
UNITED STATES PATENTS

| 2,961,657 | 11/1960 | Hodges et al. ............... | 343/714 |
|---|---|---|---|
| 3,064,172 | 11/1962 | Young et al. ................ | 318/293 |
| 3,080,514 | 3/1963 | Foss et al. .................... | 318/672 |
| 3,395,323 | 7/1968 | Peters........................... | 318/673 |

OTHER REFERENCES

A.P.C. Application of Steinbach Ser. No. 347,517, Published May 18, 1943

*Primary Examiner*—Benjamin Dobeck
*Attorney*—Flam and Flam

ABSTRACT: A selector switch is movable between limits through a number of stations corresponding to desired positions of the load. When the selector switch is moved in one direction or the other to a different station, the reversible motor is automatically connected to move in the required direction and automatically to stop when the load arrives at the selected station. This is accomplished by a two-state sensor that responds to the direction of movement of the selector switch.

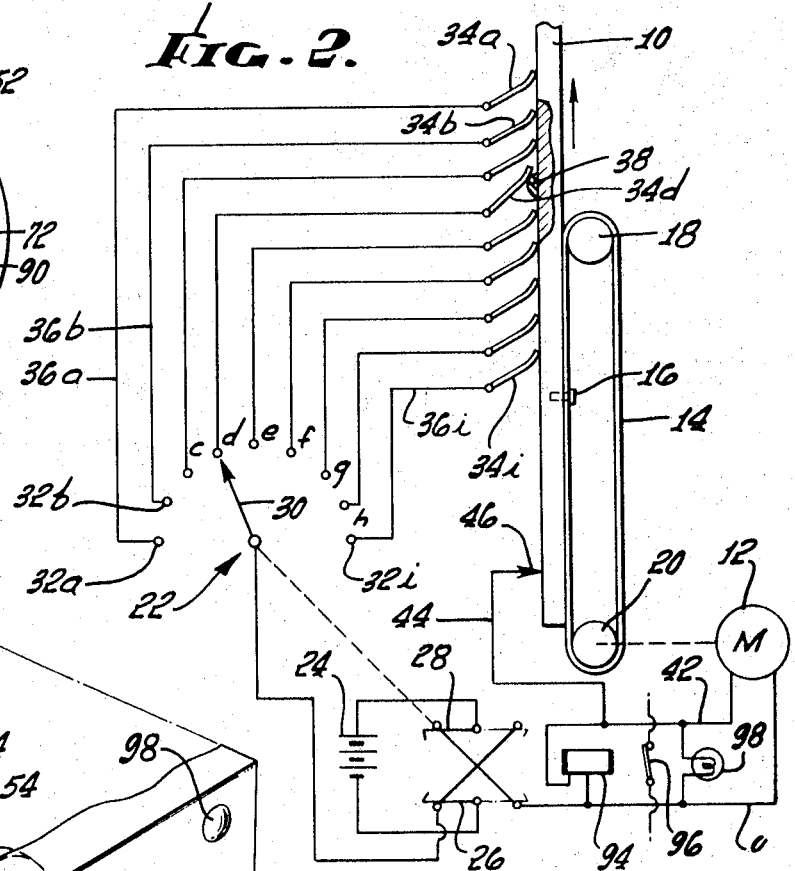

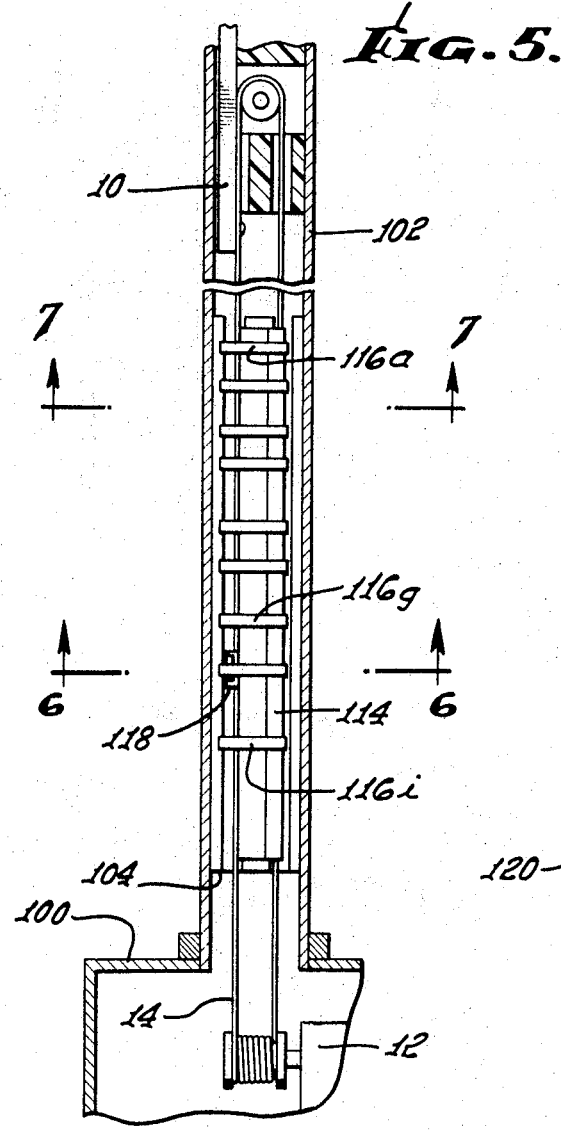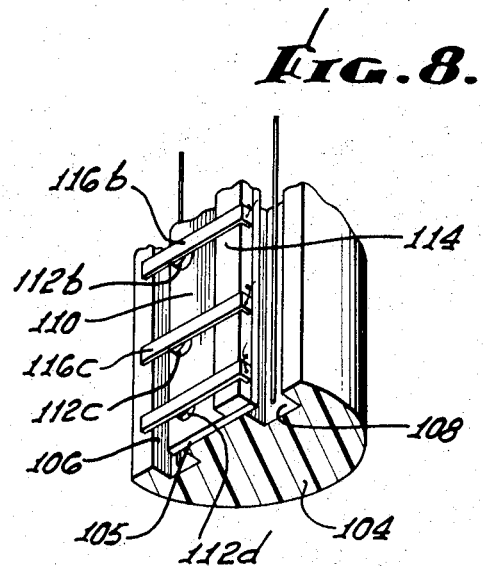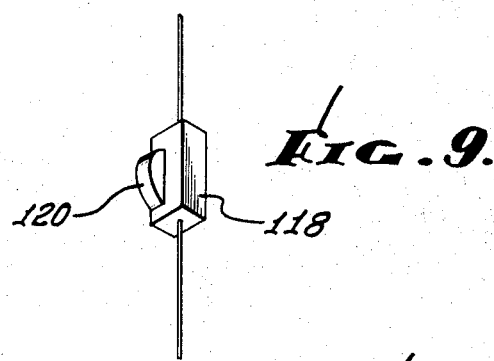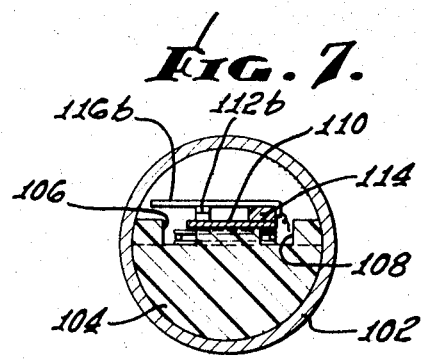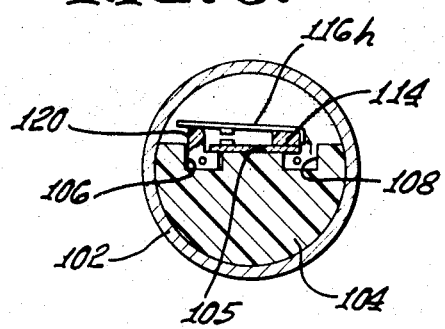

3,614,574

REVERSIBLE FOLLOW UP POSITIONING DEVICE FOR MOBILE ANTENNA STRUCTURES OR THE LIKE

BACKGROUND OF THE INVENTION

This invention relates to a remote control system for moving a load to any one of a number of positions, and more particularly, to a system in which the load is movable between limits such that reversible motive means are required. Such a system is shown and described in our prior U.S. Pat. No. 2,961,657 entitled MOBILE ANTENNA STRUCTURE. In that patent, movement of the antenna shorting bar is accomplished by operating a reversing switch for connecting a DC motor to a current source. A meter signals the arrival of the shorting bar to successive stations.

The difficulty with this arrangement is that it requires a certain degree of continuing attention. If the user is simultaneously driving the automobile, the hazard is obvious.

The primary object of this invention is to provide a simple followup system in which the antenna or other load automatically moves in the required direction and automatically stops at the selected station merely by virtue of the movement of a selector switch. Accordingly, no continuing attention of the operator is required.

When a transceiver is to be operated on a different band, its circuit elements are connected in a different array. Band changing is ordinarily accomplished by operation of a selector switch. Another object of this invention is to provide a reversible followup positioning device for an antenna that is coupled to the band switch of the transceiver whereby the transceiver and the antenna are simultaneously switched by a single operation.

Additional objects of this invention are to provide a simple reliable apparatus for the foregoing purposes, and to provide a system comprising relatively few parts.

BRIEF SUMMARY OF THE INVENTION

The foregoing objects are made possible by using a simple friction coupling between the operators of a selector switch and the reversing switch, together with stops for limiting movement of the reversing switch. The friction coupling provides a means whereby the required direction of movement of the motor is sensed.

BRIEF DESCRIPTION OF THE DRAWINGS

A detailed description of the invention will be made with reference to the accompanying drawings. These drawings, unless described as diagrammatic or unless otherwise indicated, are to scale.

FIG. 1 is a pictorial view of a transceiver cabinet at which the selector switch is installed.

FIG. 2 is a schematic wiring diagram.

FIG. 3 is an axial sectional view of the combined selector switch and reversing switch structure.

FIG. 4 is a sectional view taken along a plane corresponding to line 4—4 of FIG. 3.

FIG. 5 is an axial sectional view of the position-sensing switch.

FIGS. 6 and 7 are axial sectional views taken along planes corresponding to lines 6—6 and 7—7 of FIG. 5.

FIG. 8 is a pictorial view of a section of the sensing switch.

FIG. 9 is a pictorial view of the cable carried switch differ.

DETAILED DESCRIPTION

The following detailed description is of the best presently contemplated mode of carrying out the invention. This description is not to be taken in a limiting sense, but is made merely for the purpose of illustrating the general principles of the invention since the scope of the invention is best defined by the appended claims.

In FIG. 2 there is illustrated a load in the form of a bar 10 guided by suitable means (not shown) for movement in a rectilinear path. In the present example, the bar 10 shorts a number of sections of an antenna coil depending upon the longitudinal position of the bar. A shorting bar of this type is shown in our prior U.S. Letters Pat. No. 2,961,657.

The bar 10 is moved by reversible motive means, in this instance, a DC motor 12. The bar 10 is coupled to the motor 12 by suitable means such as by the aid of a pulley cable or belt 14. The bar 10 is fastened along one run of the belt as by a screw 16. The pulley belt 14 cooperates with pulleys 18 and 20, one of which is directly coupled to the shaft of the motor 12. Due to the nature of the load, the motive means must be reversible. A polarity sensitive DC motor fulfills the requirement. More elaborate arrangements including shiftable transmissions could be provided.

The motor has an energization circuit that is dependent upon a selector switch 22 and upon the bar 10 being away from the position commanded by the selector switch. A DC power source, in this instance indicated as a battery 24, is connected to the motor circuit through a polarity-reversing switch. The operative elements of the switch are conductive segments 26 and 28 movable in unison to opposite contacting positions.

The selector switch has an arm 30 that is cooperable with any one of a number of switch contacts 32a, 32b, 32c, 32d, 32e, 32f, 32g, 32h and 32i. Each contact electrically connects to a common return line through respective wipers 34a, 34b, 34c, 34d, 34e, 34f, 34g, 34h and 34i. The common return is shown in FIG. 2 as including the bar 10. In practice and in a manner to be hereinafter described in connection with FIGS. 5 to 9, a separate return bus bar is provided. The wipers 34a to 34i inclusive are spaced along the path of movement of the cable 14 or bar 10 at positions corresponding to intended stations of the shorting bar. Leads 36a, 36b, 36c, 36d, 36e, 36f, 36g, 36h and 36i connect the selector switch contacts to the individual wipers.

The shorting bar is shown as carrying a projection 38 operable to lift the wipers away from conductive engagement with the shorting bar 10. In the full-line position shown in FIG. 2, the projection 38 has lifted the wiper 34d that is electrically connected to the selector switch arm 30 through contact 32d. Accordingly, any circuit through the contact 32d is open and thus is incapable of providing power for the motor. However, all other contacts 32a.....32i are in conductive relationship to the bar 10. Any one of these contacts is capable of sustaining energization current for the motor 12.

Assume, for example, that the contact arm 30 is now moved to engage the contact 32f. A circuit for the motor 12 will be established as follows: positive side of the battery 24, reversing switch segment 28, lead 40 to one side of the motor 12, leads 42 and 44, a brush 46 continuously engageable with the bar 10, wiper 34f, switch arm 30, segment 26 of the reversing switch to the opposite end of the battery. The motor 12 accordingly moves downwardly until the projection 38 interrupts the circuit by lifting the wiper 34f.

If subsequently the arm 30 is moved in the opposite direction, say, to engage the contact 32c, the bar 10 will be moved upwardly until the projection 38 lifts the wiper 34c. The polarity of the motor circuit is reversed. This is accomplished by movement of segments 26 and 28 to the dotted line position of FIG. 2. The reversing switch operates automatically according to the direction of movement of the switch arm 30. The mechanism for this function is shown in FIGS. 3 and 4.

The assembly shown in FIG. 1 includes the selector switch 22 as well as the reversing switch. The assembly, in the present instance, comprises three wafers 48, 50 and 52 supported by the aid of rods 54 and 56 and held in spaced relationship by suitable means including spacers 58 and 60. A selector switch operator or shaft 62 extends through a suitable bearing 64 and through a panel 66. The end of the operator carries a knob 68. A nut 70, in a conventional manner, secures the bearing 64 in place and thereby mounts the wafer 48 and the assembly of which it is a part. The shaft 62 carries the switch arm 30. The arm may be in the form of a ring having a projection, the projection-engaging spaced contacts and the ring cooperating with a brush in order to make the connection shown in FIG. 2. The switch arm 30 is mounted on the end of an insulation sleeve 72 in turn affixed to the shaft 62 by a setscrew 74. The contacts 32 are equiangularly arrayed about the intermediate wafer 50 for cooperation with the switch arm 30, all in a well understood manner.

The first wafer 48 provides recesses for cooperation with a spring arm 76 whereby the shaft is stabilized in discrete angularly spaced contacting positions, all in a well understood manner.

The reversing switch includes a number of contacts 78 mounted upon the end wafer 52. These contacts cooperate with the movable segments 26 and 28 connected to an operator or shaft 80 that is in end-to-end relationship with the selector switch shaft 62. The shaft has a noncircular part that fits a disc 82 journaled at the central aperture of the wafer 52. Upon angular movement of the shaft 80 in one direction, the contacts 78 connect the battery in one polarity to the motor circuit; and upon angular movement of the disc 82 in the opposite direction, the battery is connected in reverse polarity.

The disc 82 is movable only through an angle corresponding to one increment of movement of the switch 30. For this purpose, the shaft 80 carries a pair of stops 84 and 86 (see also FIGS. 1 and 4) cooperable with the post 54.

The shaft 80 is moved in one direction r the other by a friction coupling. The shaft 80 carries a sleeve 88 that matches the diameter of the insulation sleeve 72. A split sleeve 90 compasses both sleeves 72 and 88 and is constricted to engage both by the action of a coiled wraparound spring 92, Accordingly, but for the stops 84 and 86, the shafts 80 and 62 are coupled for movement. However, the friction coupling yields when movement of the shaft 80 is arrested. If the selector switch is reversed in angular movement, for one or more positions, the reversing switch assumes its opposite state for appropriate switch operation. When the knob 68 is moved in one direction, the reversing switch assumes one state; and when the knob 68 is moved in the other direction, the reversing switch assumes its other state. The motor is therefore always connected with the polarity required to move the shorting bar 10 to the station dictated by the position of the switch arm 30. Other friction couplings can be provided.

As shown in FIG. 1, the knob 68 may cooperate with a scale that reads directly in the broadcast band. Moreover, the shaft 62 may be directly coupled to the band switching circuits of the transceiver. For example, the shaft 62 may have a reduced extension extending through an axial bore in the shaft part 80. Optionally, the shaft 62 may be coupled to band switching circuits by other transmission elements.

It is desirable that the power circuit for the transmitter be off until the bar 10 reaches its selected position. For this purpose, a simple relay coil 94 is provided that parallels the motor. When the motor is operating, the relay opens relay contacts 96 that are serially inserted in a power lead for the transmitter. A pilot light 98, conveniently located adjacent the knob 68, indicates that the motor is in operation and that the transceiver is not yet in a condition for operation.

In FIG. 5 there is illustrated a housing 100 for the motor 12 designed to be attached to the rear bumper of a vehicle. The antenna coil (not shown) is mounted on top of a tubular section 102 that extends upwardly from the motor housing. The tubular section 102 conveniently houses the position-sensing switch mechanism and also provides space into which the shorting bar may be retracted.

The sensing switch mechanism includes a generally semicylindrical base 104 fitted in the tubular section 102. The exposed flat surface 105 of the base 104 has two spaced parallel channels 106 and 108 on opposite sides for receiving the opposite runs of the cable 14. The channel 106 on one side forms a guide for receiving the lower end of the shorting bar 10. The bar is secured to the corresponding cable run.

A terminal board 110 made of insulation material is mounted on the base surface 105 between the channels 106 and 108. The board 110 mounts a series of contacts 112a, 112b, ....112i corresponding to the wipers 34a, 34b,.... 34i of FIG. 2. These contacts are connected to the leads 36a, 36b, ....36i (FIG. 2).

The board carries a bus bar 114 (FIGS. 5–8) that connects to the motor lead 44 (FIG. 2). A series of resilient contact arms 116a, 116b, ..... 116i are mounted on the bus bar 114 and normally engage the contacts 112a, 112b, ....112i respectively. The arms have ends overlying the channel 106 in position to be engaged by a lifter 118 (FIGS. 5 and 9) carried by the cable. The lifter 118 has a rectangular base part that slides in the channel 106, and a lobe 120 of insulation material that projects out of the channel for engagement with the contact arms. The operation heretofore described is achieved by the simple structural arrangement shown.

We claim:

1. In a followup remote positioning system for a load: reversible motive means for moving the load; a selector device having a movable operator; means for stopping the motive means when said load arrives at a station corresponding to selector device position; a two state control for determining the direction of movement of said motive means and having an operator movable in opposite directions for determining the state of said control; and a coupling between said selector device operator and said control operator for positioning said control operator in accordance with the direction of movement of said selector device operator.

2. The system as set forth in claim 1 in which said two state control comprises a reversing switch and in which said motive means comprises a polarity-sensitive motor.

3. The system as set forth in claim 1 together with means for limiting the movement of said control operator; said coupling comprising a friction coupling; the range of movement of said control operator corresponding to the range of movement of said selector device operator between adjacent selector positions.

4. In a followup remote positioning system for an antenna coil shorting bar: a reversible motor connected to the bar; a series of normally closed contacts spaced along the path of movement of the bar; means connected to the bar for momentarily opening the contacts in succession as the bar moves between limits; a series of parallel energization circuits for the motor, including a selector switch having a series of contacting positions respectively corresponding, in sequence, to the normally closed contacts; said selector switch being movable between opposite limits; one of said normally closed contacts being in series circuit with said motor when said selector switch is at the corresponding position; a reversing switch serially associated with said motor for connecting said motor in one or two polarities to an energy source; and means responsive to the direction of movement of said selector switch for correspondingly operating said reversing switch.

5. The combination as set froth in claim 4 in which said direction responsive means comprises an operator for said reversing switch and a yielding coupling between said selector switch and said operator.

6. The combination as set forth in claim 4 together with band switching means coupled to said selector switch.

7. The combination as set forth in claim 4 together with means for interrupting transceiver power while said motor is energized.

8. In a followup remote positioning system for a load:
a. reversible motor means for moving the load;
b. a selector device having an operator shaft movable to any one of a number of selected positions;
c. means stopping the motor means when said load arrives at a station corresponding to the selected position of said operator;
d. a reversing switch having an operator shaft movable between opposite limits to determine opposite switching states of said switch;
e. a yielding friction coupling between said operator shafts whereby the motor means is direction controlled in accordance with the direction of movement of the operator shaft for said selector device.